(12) United States Patent
Hu et al.

(10) Patent No.: US 6,702,599 B2
(45) Date of Patent: Mar. 9, 2004

(54) CARD EJECTING MECHANISM FOR AN ELECTRONIC CARD CONNECTOR

(75) Inventors: Jinkui Hu, Kunsan (CN); ZiQiang Zhu, Kunsan (CN); Guohua Zhang, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/138,436

(22) Filed: May 2, 2002

(65) Prior Publication Data

US 2003/0114031 A1 Jun. 19, 2003

(30) Foreign Application Priority Data

Dec. 19, 2001 (TW) .................................. 90222279 U

(51) Int. Cl.$^7$ .............................................. H01R 13/62
(52) U.S. Cl. ....................................................... 439/159
(58) Field of Search .................................. 439/159, 160, 439/152–155

(56) References Cited

U.S. PATENT DOCUMENTS 6,022,228 A * 2/2000 Kuo ............................ 439/159

* cited by examiner

*Primary Examiner*—Ross Gushi
*Assistant Examiner*—Phuongchi Nguyen
(74) *Attorney, Agent, or Firm*—Wei Te Chung

(57) ABSTRACT

An electronic card connector (1) includes a body portion (2) including a head section (20) with terminals (3) retained therein and a pair of guiding arms (22), an ejecting lever (5) pivotally mounted on the head section for ejecting an inserted card, and a push rod (4) for driving the ejecting lever. One of the guiding arms defines a guiding channel (225) and has a contacting portion (226). The push rod is moveably received in the guiding channel and has a spring tab (44) abutting against the contacting portion of the guiding arm when the push rod moves in a card inserting direction, or in a card ejecting direction. The friction generated by movement of the spring tab along the contacting portion allows an operator to feel a better sense of operation of the card ejecting mechanism.

1 Claim, 7 Drawing Sheets

CARD EJECTING MECHANISM FOR AN ELECTRONIC CARD CONNECTOR

BACKGROUND OF THE INVENTION

1. Field of the Invention

The present invention relates to a card ejecting mechanism for an electronic card connector, and particularly to a card ejecting mechanism which is more easily operated.

2. Description of Related Art

Electronic card connectors are widely used in electronic products, such as digital cameras, for electrically connecting with inserted electronic cards which function as removable mass storage devices. The electronic card connectors are often equipped with ejecting mechanisms for conveniently disconnecting and ejecting the inserted cards therefrom. A conventional electronic card connector generally comprises a pair of parallel guiding arms, a head portion located between the guiding arms and receiving a plurality of terminals therein, and an ejecting mechanism. The ejecting mechanism includes a push rod moveably mounted on one of the guiding arms, and an ejecting lever pivotally mounted on the head portion. The push rod is moveably connected to one end of the ejecting lever for driving the ejecting lever. An opposite end of the ejecting lever forms an abutment for pushing against an inserted card when the ejecting lever is rotated. When the push rod is pushed inward in a card inserting direction, the ejecting lever rotates, driving the abutment to disconnect and eject the card from the card connector. However, the pushing force exerted on the push rod varies according to different users. If the push rod is subject to a large pushing force, the card may fly out of the card connector and fall down on the ground, damaging the electric capability of the card.

Taiwan Patent No. 268671 discloses a card ejecting mechanism comprising a pair of spring elements mounted on two guiding arms of an electronic card connector. Each spring element includes a spring portion having an inward projection for engaging with side walls of an inserted card. When a push rod of the electronic card is actuated to move in a card inserting direction, the card moves outward along the guiding arms and arrives at a position where the inward projections of the spring elements abut against side walls of the card, thereby preventing the card from further movement (i.e., the card is prevented from flying out of the connector). However, at the moment the card engages with the inward projections of the spring elements, both the card and the projections are subject to large impact forces which can result in both of them being damaged. Understandably, due to frequent operation, the spring elements lose effectiveness over time.

Hence, an improved card ejecting mechanism is required to overcome the disadvantages of the related art.

SUMMARY OF THE INVENTION

Accordingly, a first object of the present invention is to provide a card ejecting mechanism for an electronic card connector for reliably ejecting a card inserted into the connector.

A second object of the present invention is to provide an electronic card connector having a card ejecting mechanism which is easier to operate.

In order to achieve the objects set forth, an electronic card connector having an ejecting mechanism in accordance with the present invention is disclosed. The connector comprises a body portion including a head section with terminals retained therein for engaging with an electronic card and a pair of guiding arms rearwardly extending from opposite ends of the head section, an ejecting lever being pivotally mounted on the head section for ejecting an inserted card, and a push rod for driving the ejecting lever. One of the guiding arms defines a guiding channel and has a contacting portion with a contacting face extending in a longitudinal direction of the guiding arm. The push rod is moveably received in the guiding channel of the guiding arm and has a spring tab integrally extending therefrom. The spring tab includes a main portion connected with the push rod and forming a U-shape with the push rod and a spring arm extending from the main portion in a direction parallel to the push rod. The spring arm has an abutment at a free end thereof which extends closer to the push rod than other sections of the spring arm. To eject the card from the connector, the push rod is actuated to move along the guiding channel in a card inserting direction via a pushing force exerted by a user on the push rod. The abutment of the spring tab begins to resiliently abut against the contacting face of the contacting portion, whereby a predetermined friction between the abutment and the contacting portion is established to allow the user to feel a better sense of operation. Thus, the card can be safely removed from the connector.

Other objects, advantages and novel features of the invention will become more apparent from the following detailed description when taken in conjunction with the accompanying drawings.

DETAILED DESCRIPTION OF THE INVENTION

Figure 1:
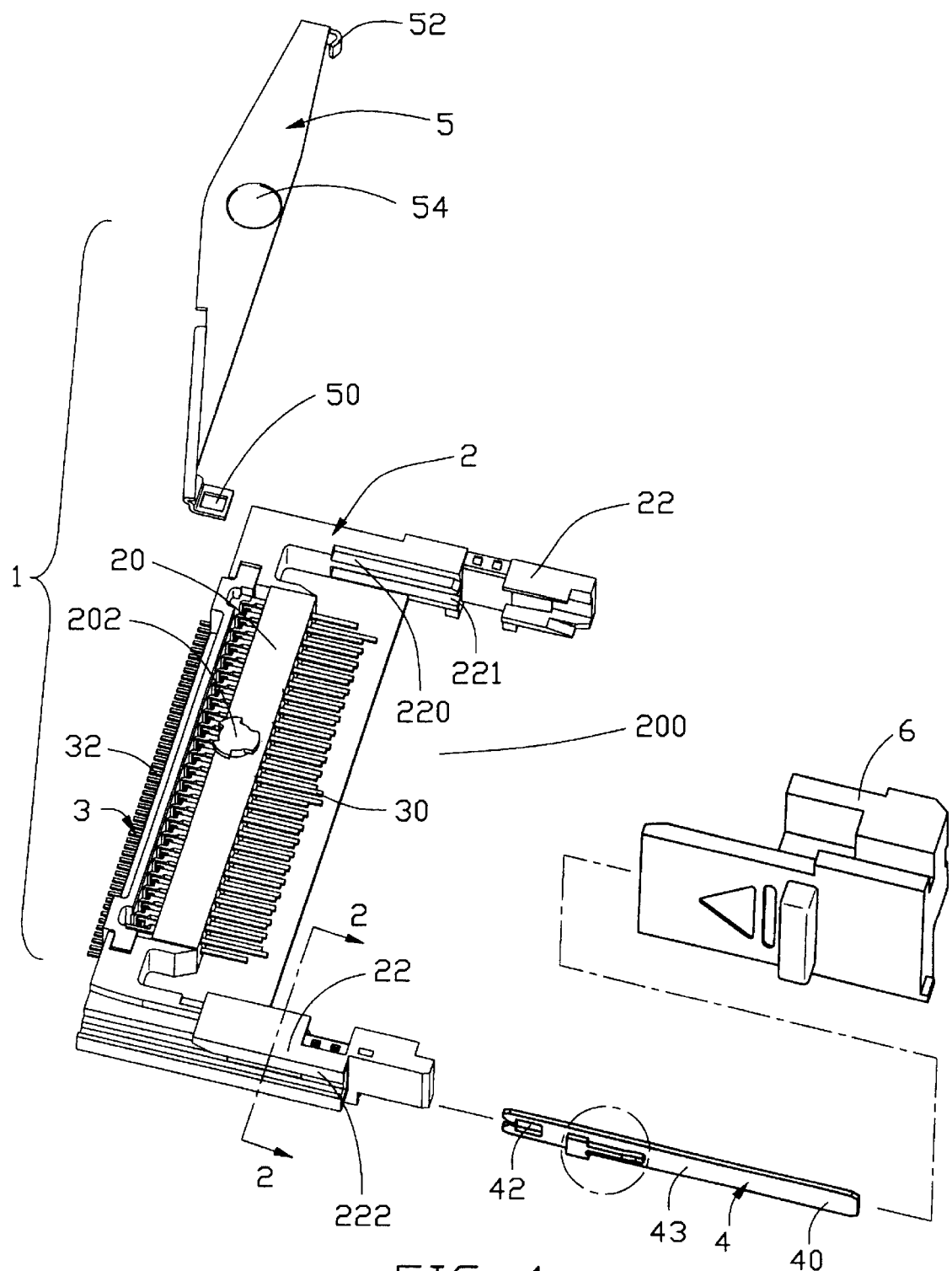
FIG. 1 is an exploded, perspective view of an electronic card connector having a card ejecting mechanism in accordance with the present invention.

Referring to FIG. 1, an electronic card connector 1 having a card ejecting mechanism in accordance with the present invention is shown. The connector 1 comprises a dielectric body portion 2 including an elongated head section 20 in which a plurality of terminals 3 is received for electrical connection with an inserted card (not shown), and a pair of guiding arms 22 extending rearwardly from opposite ends of the head section 20 for guiding the card. A card-receiving space 200 with a card-receiving opening is defined by the head section 20 and the opposite guiding arms 22. The head section 20 has an embossment 202 on an upper surface thereof. Each guiding arm 22 has a pair of vertically aligned, parallel projections 220 on an inner surface thereof. A card-receiving channel 221 is provided between the projections 220 of the guiding arm 22.

Figure 2:
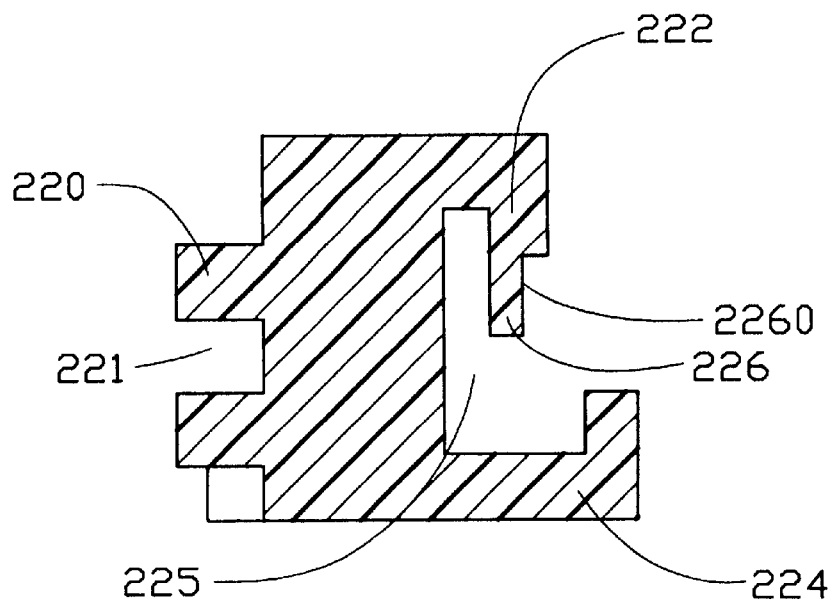
FIG. 2 is a cross-sectional view of a guiding arm of the card connector taken along section line 2—2 in FIG. 1.

Referring to FIG. 2 in conjunction with FIG. 1, one of the guiding arms 22 forms at an outside thereof a first and a second L-shaped flanges 222, 224 confronting each other in an offset manner and together defining a guiding channel 225 therebetween. A contacting portion 226 integrally and downwardly extends from a distal end of the first flange 222. The contacting portion 226 has a contacting face 2260 extending in a longitudinal direction of the guiding arm 22.

Each terminal 3 includes a mating portion 30 extending into the card-receiving space 200 for electrical connection with corresponding terminals of the inserted card, a retention portion (not shown) retained in the head section 20, and a tail portion 32 extending beyond a front face of the head section 20 for electrically connecting with a printed circuit board (not shown) using a Surface Mount Technology (SMT).

Figure 4:
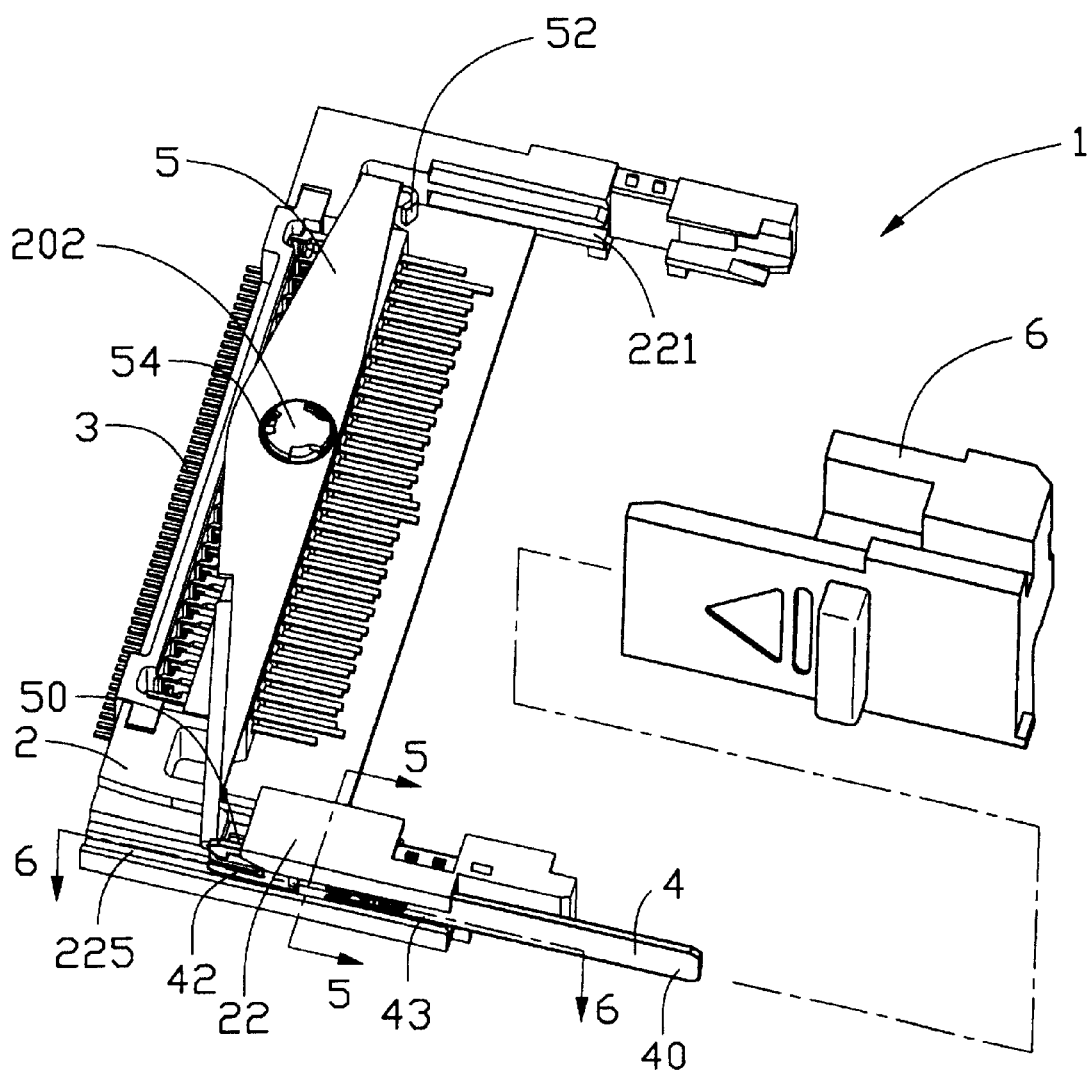
FIG. 4 is a partially assembled view of the card connector of FIG. 1.

Referring to FIG. 4 in conjunction with FIG. 1, the ejecting mechanism of the connector 1 comprises a push rod 4 moveably received in the guiding channel 225 of the guiding arm 22, and an ejecting lever 5 pivotally mounted on the head section 20. The push rod 4 has an actuating end 40 for being connected to a push-button 6, and an opposite end 42 connected to a joint end 50 of the ejecting lever 5. The ejecting lever 5 has a pushing projection 52 formed on an end thereof opposite the joint end 50 for ejecting the card from the connector 1. The ejecting lever 5 defines a hole 54 between the joint end 50 and the pushing projection 52 for engaging with the embossment 202 of the head section 20, whereby the ejecting lever 5 is pivotally mounted on the head section 20. The embossment 202 functions as a fulcrum about which the ejecting lever 5 rotates.

Figure 3:
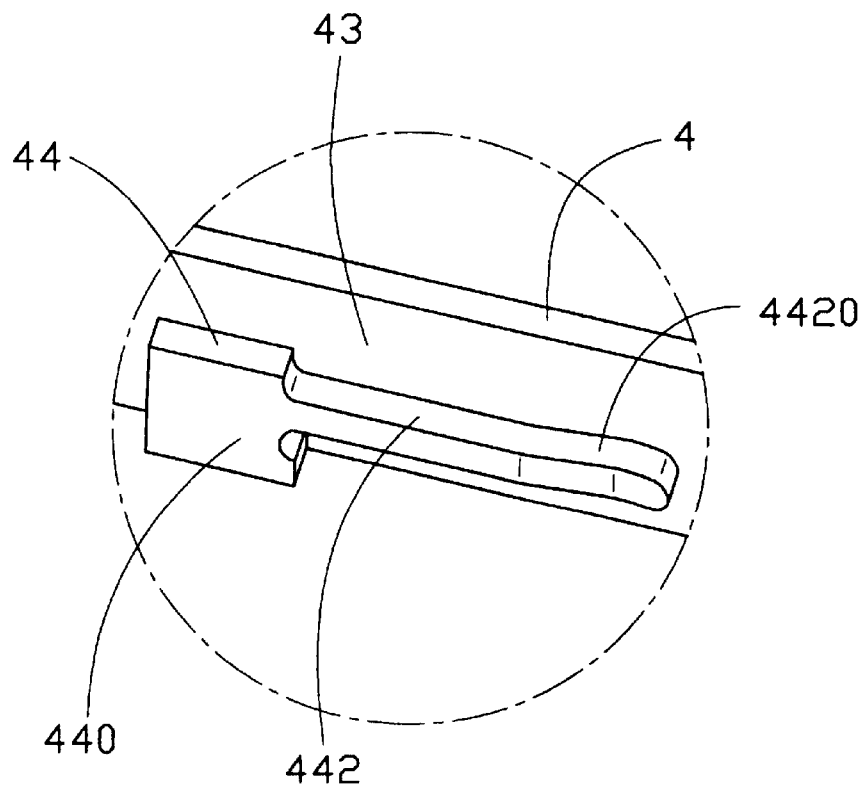
FIG. 3 is an enlarged, perspective view of a circled portion in FIG. 1.
Figure 5:
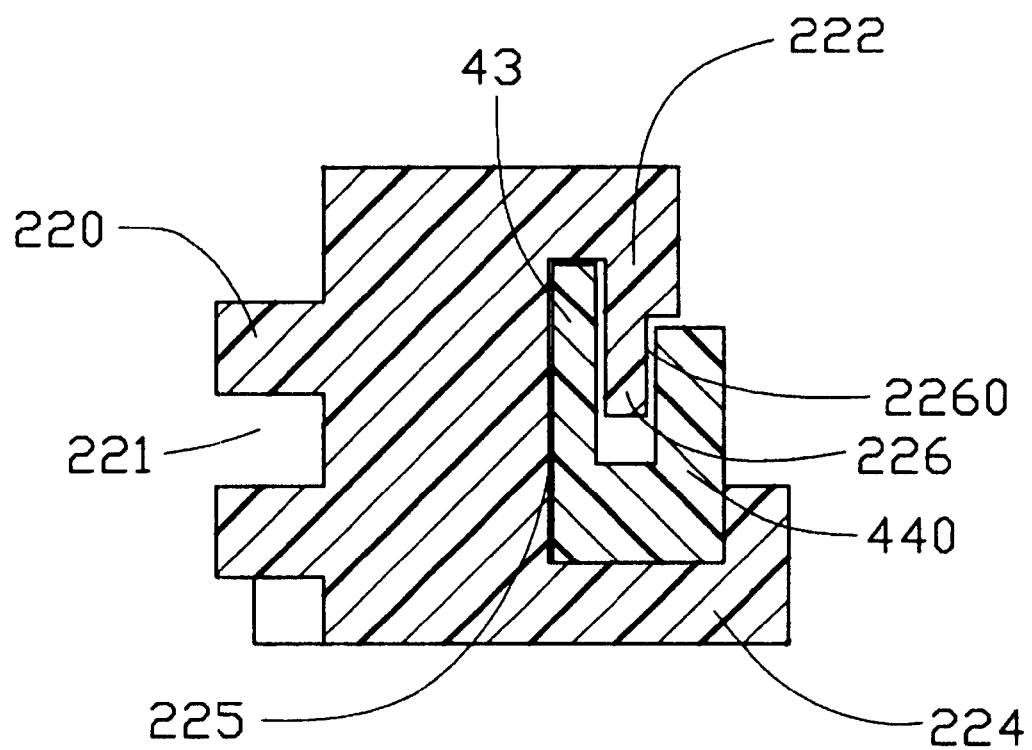
FIG. 5 is a cross-sectional view of the guiding arm and a push rod of the card connector taken along section line 5—5 in FIG. 4.

Referring to FIGS. 3 and 5, the push rod 4 has a spring tab 44 extending outwardly from an intermediate section 43 between the actuating end 40 and the opposite end 42. The spring tab 44 includes a main portion 440 connected with the push rod 4 and forming a U-shape together with the push rod 4, and a spring arm 442 integrally extending from a rear edge of the main portion 440 in a direction parallel to the push rod 4. The spring arm 442 has an abutment 4420 at a free end thereof extending toward the push rod 4 to be closer to the push rod 4 than other sections of the spring arm 442 for contacting with the contacting portion 226 of the guiding arm 22.

Figure 6:
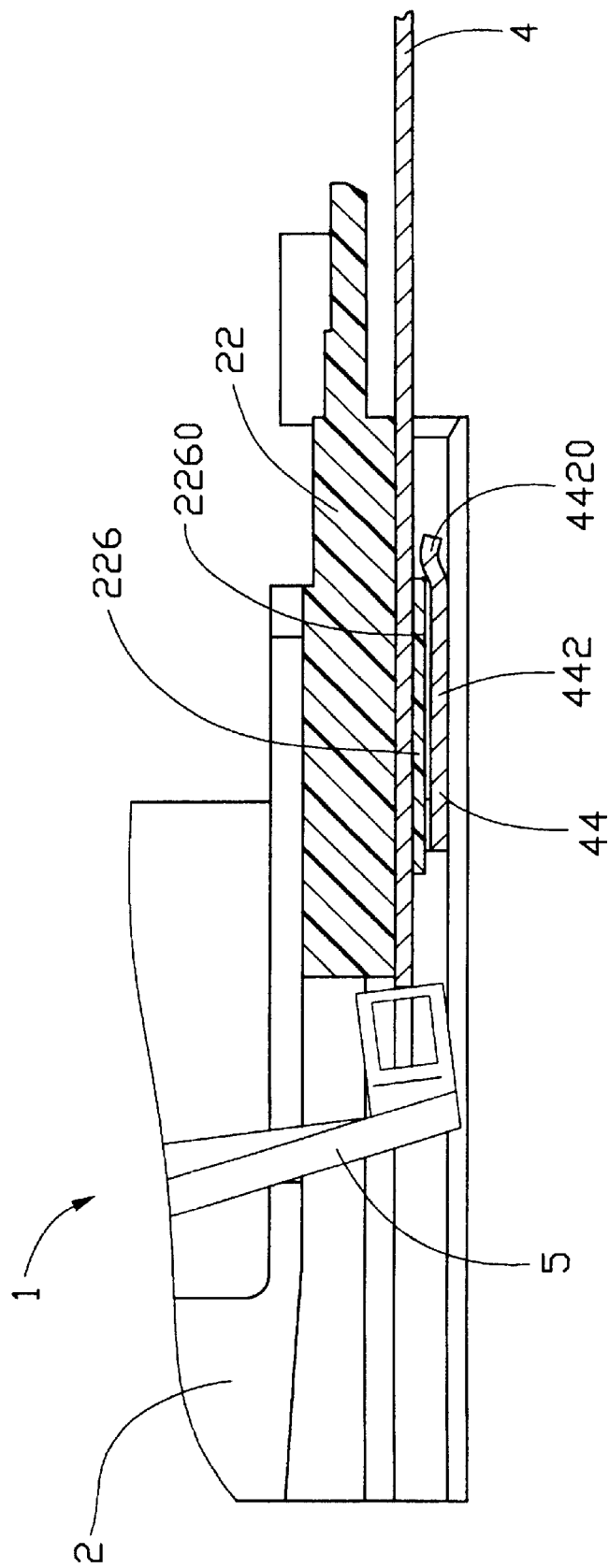
FIG. 6 is a partial, cross-sectional view of the card connector taken along section line 6—6 in FIG. 4, showing the push rod of the card ejecting mechanism in an original position before ejecting an inserted card.
Figure 7:
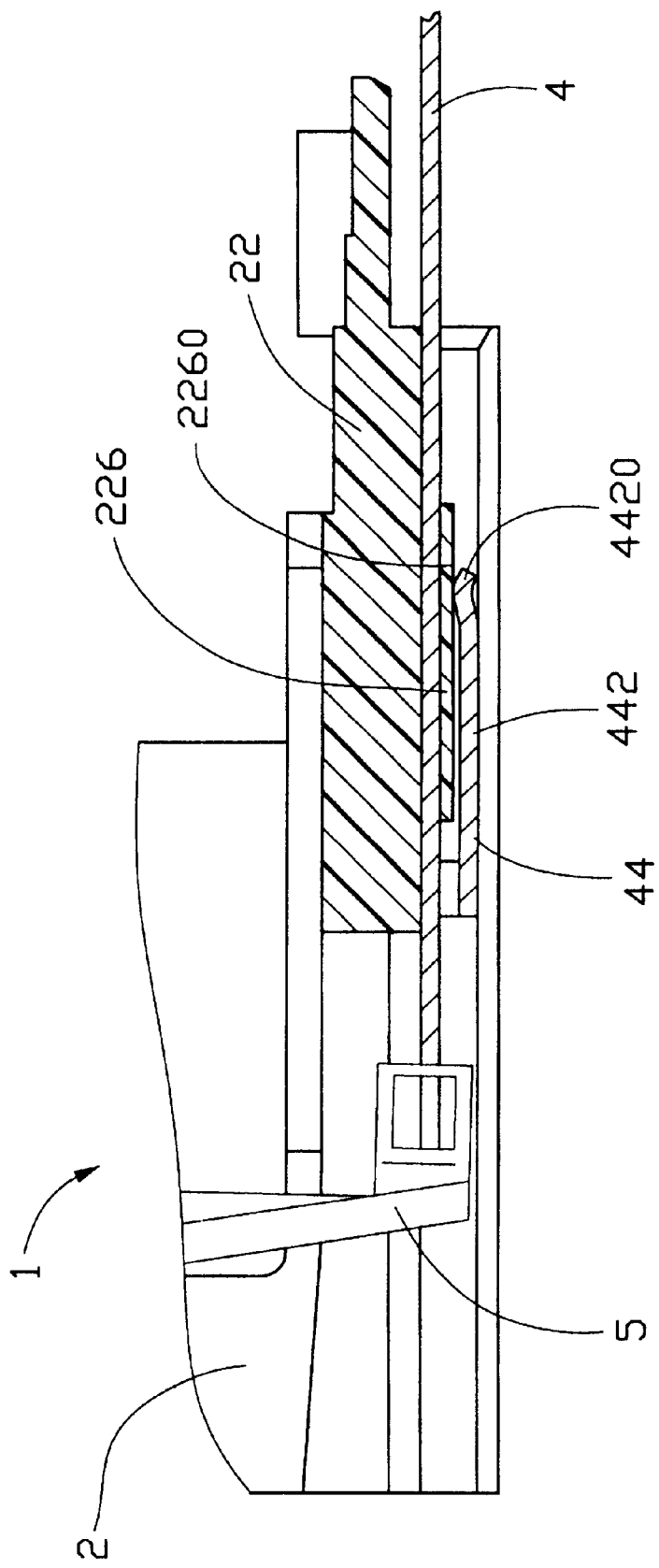
FIG. 7 is a view similar to FIG. 6 but showing the push rod in an intermediate position during ejecting the inserted card.
Figure 8:
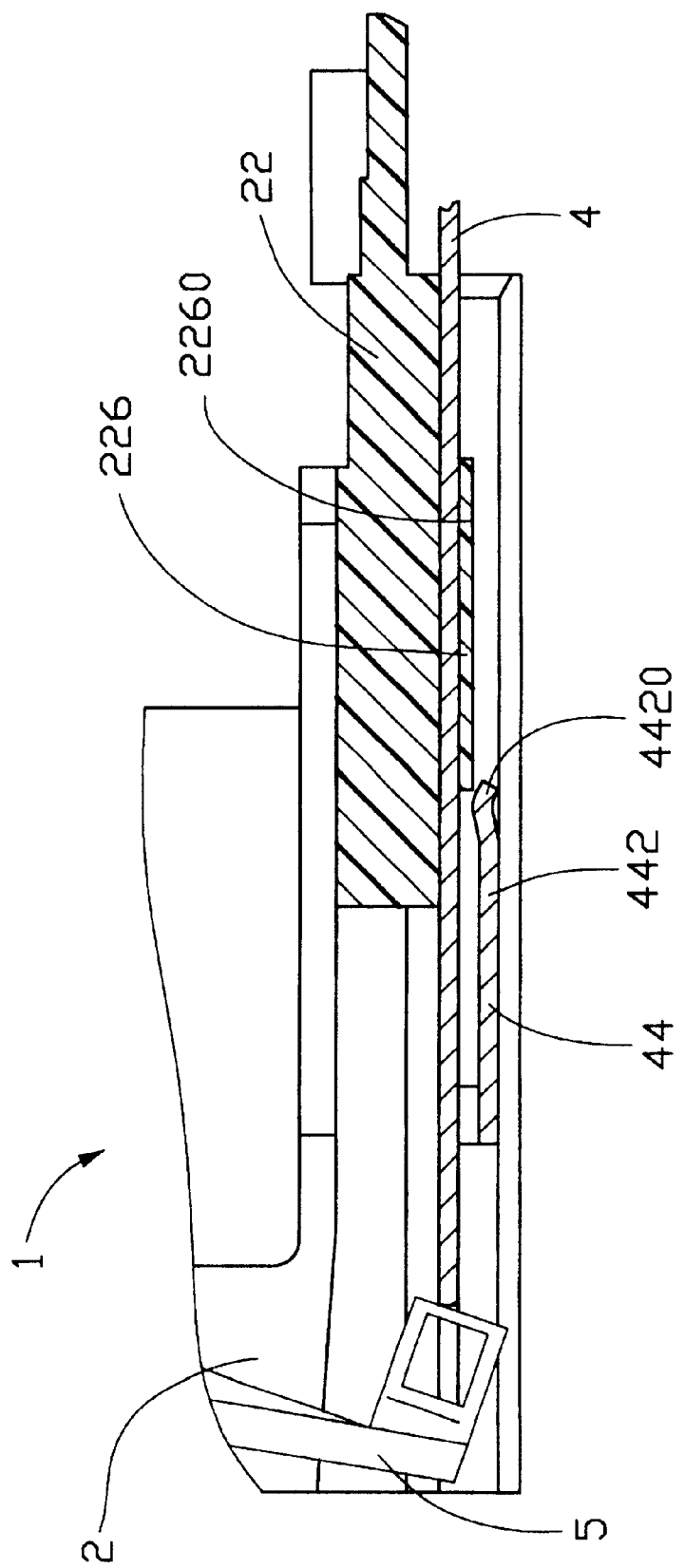
FIG. 8 is a view similar to FIG. 6 but showing the push rod in a final position where the card is adequately ejected from the connector.

FIGS. 6–8 show the relationship between the spring tab 44 of the push rod 4 and the contacting portion 226 of the guiding arm 22 during the process of ejecting the card. To eject the card from the connector 1, the push rod 4 is actuated to move along the guiding channel 225 in a card inserting direction via a pushing force exerted by a user on the push-button 6. The abutment 4420 of the spring tab 44 begins to resiliently abut against the contacting face 2260 of the contacting portion 226, whereby a predetermined friction between the abutment 4420 and the contacting portion 226 is established to allow the user to feel a better sense of operation. Because a length of the contacting portion 226 is equal to a distance of the travel of the card, the abutment 4420 of the push rod 4 immediately disengages from the contacting portion 226 as soon as the card is completely ejected from the connector 1. Then, the card is safely removed from the connector 1 by the user, and over movement of the card (i.e., the card flying out of the connector) is prevented.

During insertion of the card into the card-receiving space 200 of the connector 1, the card is guided by the guiding arms 22 and then connects with the mating portions 30 of the terminals 3. During this process, the card pushes against the pushing projection 52, rotating the ejecting lever 5, and the push rod 4 is actuated to move along the guiding channel 225 in a direction opposite to the card inserting direction. Correspondingly, the abutment 4420 of the spring tab 44 begins to contact with the contacting face 2260 of the contacting portion 226 until the card is completely engaged with the terminals 3 of the connector 1, whereby a predetermined friction is established between the abutment 4420 and the contacting portion 226. Thus, the user can also feel a better sense of operation during the process of insertion of the card.

It is noted that the user can easily confirm the condition of insertion or ejection of the card by means of the sense of operation caused by the friction between the abutment 4420 of the spring tab 44 and the contacting portion 226 of the guiding arm 22. During the process of ejecting the card, the user can inerrably confirm whether the card is completely ejected from the connector 1, thereby stopping the card from further movement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic card connector for receiving an electronic card therein, comprising:

a body portion including a pair of guiding arms and a head section located between the guiding arms, one of the guiding arms defining a guiding channel and having a contacting portion;

a plurality of terminals retained in the head section for electrically connecting with the inserted electronic card; and an ejecting mechanism including a push rod received in the guiding channel of the guiding arm and moveable along a front-to-back direction for insertion or ejection of the card, the push rod having a tab abutting against the contacting portion of the guiding arm to generate a force therebetween. the force being larger when the push rod is in a moving status, while being smaller when the push rod is in either an innermost position or an outermost position;

wherein the contacting portion interior surface has a contacting face extending in a longitudinal direction of the guiding arm;

wherein the tab includes a main portion connected with the push rod and forming a U-shape with the push rod and a spring arm extending from the main portion in a directional parallel to the push rod;

wherein the spring arm has an abutment at a free end thereof which extends closer to the push rod than other sections of the spring arm for contacting with the contacting face of the contacting portion;

wherein each guiding arm defines a card-receiving channel in an inner surface thereof for guiding the card upon the insertion of the card toward the head section.

* * * * *